United States Patent [19]

Cartner

[11] 4,445,312
[45] May 1, 1984

[54] MOWER HEAD WITH MOVEABLE GUARD

[76] Inventor: Jack O. Cartner, 1005 N. 8th St., Cambridge, Ohio 43725

[21] Appl. No.: 416,580

[22] Filed: Sep. 10, 1982

[51] Int. Cl.³ .................... A01D 67/00; A01D 75/20
[52] U.S. Cl. .................................... 56/15.5; 56/17.4; 56/320.1; 56/DIG. 20
[58] Field of Search ................... 56/10.4, 10.7, 15.3, 56/15.5, 15.7, 17.4, 320.1, 320.2, 500, 503, DIG. 20; 144/251 R

[56] References Cited

U.S. PATENT DOCUMENTS

| | | | |
|---|---|---|---|
| 2,312,972 | 6/1941 | Orr | 56/320.1 |
| 3,483,905 | 12/1969 | Lawrence | 144/251 R |
| 3,949,539 | 4/1976 | Cartner | 56/10.4 |
| 4,137,806 | 2/1979 | Segal et al. | 144/251 R |
| 4,282,704 | 8/1981 | Stevens | 56/320.1 |

OTHER PUBLICATIONS

Cartner Corporation Roadside Maintainer Trimph ROTO-FLEX 50.
Terrain King Boom-Axe, Versa Mower, A-Boom, Versa Boom.

Primary Examiner—Gene Mancene
Assistant Examiner—David I. Tarnoff
Attorney, Agent, or Firm—Fay & Sharpe

[57] ABSTRACT

A primer mower (A) has an articulated boom assembly (B) connected to it. A mower head (C) is connected with the other end of the boom assembly. This enables the mower head to be positioned substantially parallel with the ground even along embankments and the like. The mower head includes a deck (20) and a downward extending skirt (22). A rotary cutter (16) is rotatably disposed below the deck and extends outward there beyond at a cutter exposing opening (24). A guard assembly (30) is moveably disposed across the cutter exposing opening for selectively exposing the cutter to permit the cutter to strike saplings and the like. One embodiment of the guard assembly includes a first guard member (32) connected by a pivot (38) to the deck and having a cutter exposing opening (44) therein. A second guard member (50) is connected by a pivot (58) with the first guard member. Springs (72 and 74) bias the first and second guard members such that the cutter exposing opening is covered until the guard assembly is impacted with sufficient force to overcome the bias force and expose the cutter. In another embodiment, the guard assembly is biased across the cutter exposing opening by a hydraulic cylinder (90, 110) and associated hydraulic circuitry.

14 Claims, 7 Drawing Figures

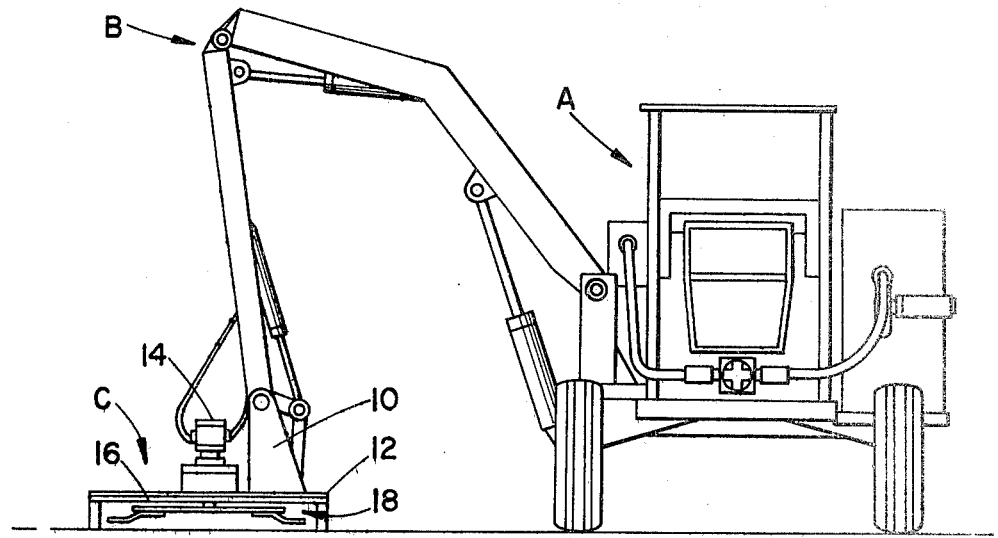
FIG. 1
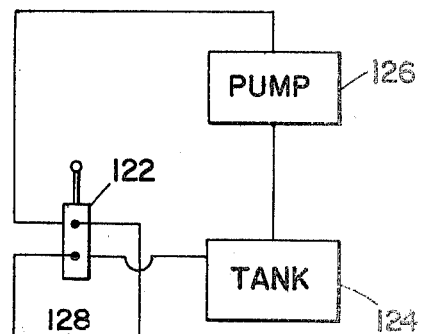
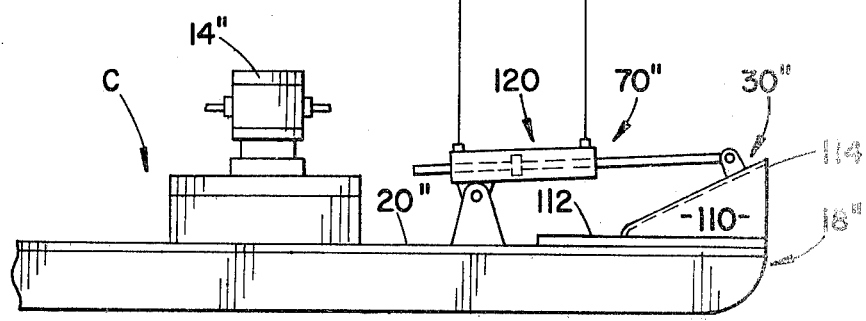
FIG. 7

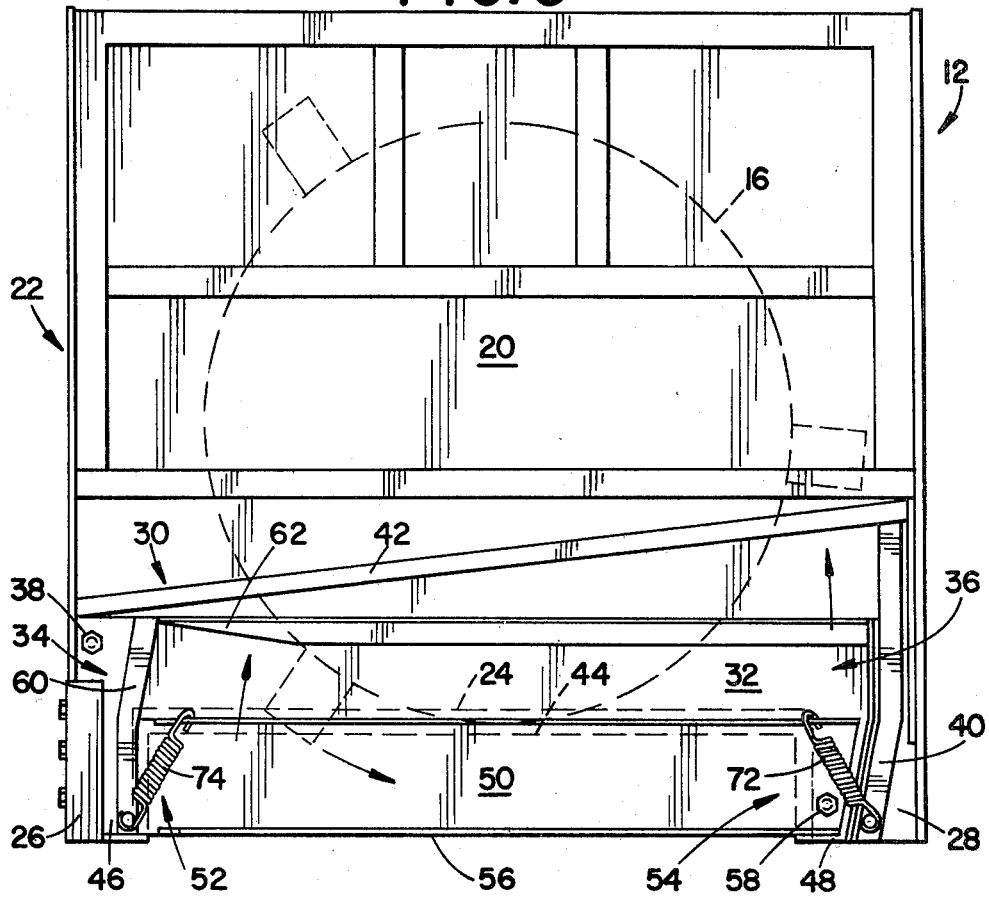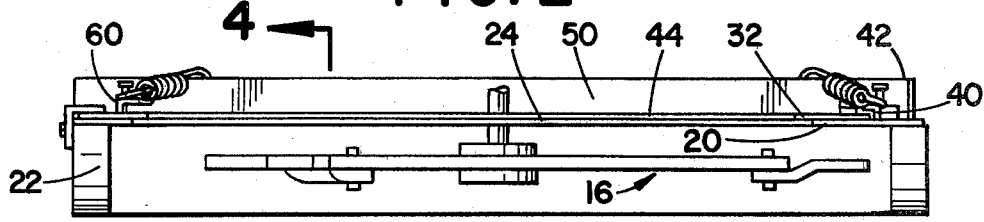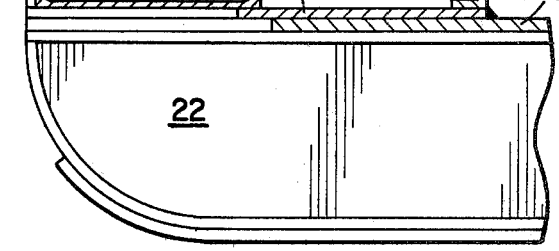

4,445,312

MOWER HEAD WITH MOVEABLE GUARD

BACKGROUND OF THE INVENTION

The invention pertains to the art of mowing and trimming apparatus. The invention finds particular application in conjunction with rotary brush and grass mowing and cutting apparatus for trimming highway medians and shoulders and will be described with particular reference thereto. It is to be appreciated, however, that the invention has other applications including clearing saplings, small trees, brush, grass, and the like.

Heretofore, mowing heads have been mounted to tractors and other prime movers with various constructions including articulated arm assemblies and side arm assemblies. The mower heads commonly include a one or a plurality of rotating cutting blades which are housed within a shield structure. The shield includes an upper deck and a skirt which extends from the upper deck below the rotary cutting blades along all but the forward side of the mower head. Various structures have been developed to allow grass and brush to pass under the forward side of the mower head into the path of the cutting blade but to inhibit other items such as the limbs of the operator from passing into the path of the cutting blade. Such structures include a plurality of rake-like projections, a plurality of short lengths of chain, and the like.

One of the problems with the prior art mower heads is that it is difficult to pass heavier brush and saplings below the shield into the cutting blade. Frequently, the mower heads are mounted with a breakaway mounting to enable them to yield upon encountering a stationary object, such as a fence post. The breakaway mounting tends to inhibit the operator from urging the mower head against the heavier brush and saplings with progressively a greater force until they yield and pass into the cutting blade.

Brush clearing devices commonly have exposed, rotary cutting blades. In areas along roadways and the like people may be harmed by the cutting blade or objects thrown by the blade.

The present invention contemplates a new and improved mower housing which overcomes the above referenced problems and others yet safely cuts grass, light brush, heavy brush, and saplings.

SUMMARY OF THE INVENTION

In accordance with a first aspect of the present invention, there is provided a mower head which includes a deck which is disposed above a circular cutter path of a rotary cutter. The deck defines a cutter exposing area along a first side of the deck. A guard assembly is disposed along the first side for movement between a first position covering the cutter path and a second position at least partially exposing the cutter path such that the cutter is partially exposed. A biasing means biases the guard toward the first position. In this manner, the guard assembly is moveable against the biasing for selectively exposing the cutter.

In accordance with another aspect of the present invention, there is provided a mower which includes a prime mover, an arm assembly connected at a first end with the prime mover and a mower head connected with the second end of the arm assembly. The mower head includes a cutter which is positionable by the arm assembly to rotate in a circular cutting path generally parallel to the ground. A shield extends above, to the sides, and the rear of the cutter. The shield defines a cutter exposing area along a forward side such that the cutter extends beyond the forward side of the shield. A guard assembly is disposed along the forward side of the shield and is moveable along a generally forward to rearward path. A biasing means biases the guard assembly forward with a preselected force such that upon encountering an object with greater than the selected force, the guard is rearwardly moveable to expose the cutter.

A first advantage of the present invention is that it is adapted to cut grass, brush, and small trees.

Another advantage of the present invention is that it protects the operator, passers-by, and others from injury.

Still further advantages will become apparent upon reading and understanding the following detailed description of the preferred embodiment.

BRIEF DESCRIPTION OF THE DRAWINGS

The invention may take form in various parts and arrangements of parts. The drawings are only for purposes of illustrating preferred and alternate embodiments of the invention and are not to be construed as limiting the invention.

FIG. 1 is a boom mower in accordance with the present invention;

FIG. 2 is an enlarged front elevation view of the mower head shield of the boom mower of FIG. 1 with the hydraulic motor removed for ease of illustration;

FIG. 3 is a top plan view of the mower head of FIGS. 1 and 2;

FIG. 4 is a sectional view through section 4—4 of FIG. 2;

FIG. 7 is a side elevational view of an alternate embodiment of a mower head in accordance with the present invention.

DETAILED DESCRIPTION OF THE PREFERRED AND ALTERNATE EMBODIMENTS

Figure 5:
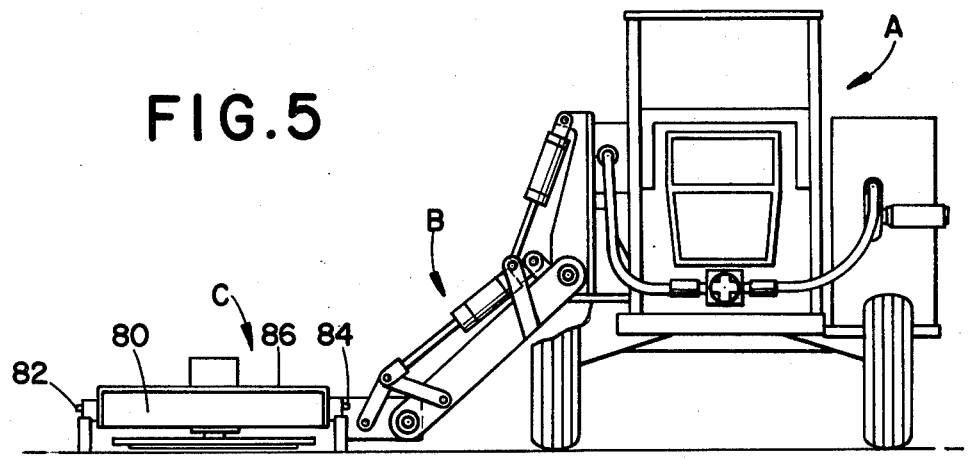
FIG. 5 is a front elevational view of a mower with a side mounted mower head in accordance with the present invention.

With reference to FIG. 1, a mower includes a prime mover A, such as a tractor, which is self-propelled to move at least in a forward and a rearward direction. An arm assembly B is operatively connected at one end with the prime mover and at the other end with a mower head C. A positioning control means, such as a plurality of hydraulic cylinders, controls the position of the arm assembly relative to the prime mover and the mower head. In this manner, the position and orientation of the mower head is selectively variable. In the embodiment illustrated in FIG. 1, the arm assembly is a boom assembly which includes at least two pivotally connected arms, one of which is pivotally connected with the prime mover and the other of which is pivotally connected with the mower or cutting head C. Optionally, one or both of the arms may be longitudinally extensible.

The mower housing includes a mounting portion 10 on which a shield portion 12 is rigidly mounted. A hydraulic motor 14 is mounted on the shield and connected with a source of fluid power by hydraulic lines extending along the arm assembly. A rotary cutter 16 which is driven by the hydraulic motor is positioned within the shield to cut brush which is received through a forward brush receiving opening 18.

With particular reference to FIGS. 2, 3, and 4, the shield includes an upper deck 20 and a skirt 22 extending downward therefrom. The skirt extends along the sides toward and away from the prime mover and the rear side, but not along the forward side, such that it defines the brush receiving opening 18. The deck includes first cutter exposing area or opening 24 which is defined between forward extending deck arms or extension 26 and 28. A guard assembly 30 is movably disposed adjacent the brush receiving opening 18 and across the cutter exposing opening 24 for selectively exposing the cutter to permit the cutter to strike saplings and the like. The guard assembly includes a first, elongated guard member 32 having a first end 34 and a second end 36. The first guard member first end 34 is pivotally mounted by a pivot means 38 with the upper deck. A channel defining means 40 is mounted on the upper deck for slidably receiving the first guard member second end 36 such that the first guard member is adapted to pivot about the first pivot means 38 generally in the plane of the upper deck. A stop means such as a support rail 42 limits the pivotal movement of the first guard member to about 7° to 10°. The first guard member includes a second cutter exposing area or opening 44 which substantially overlays the first cutter exposing opening 24. The second cutter exposing opening is defined between forward extending guard member arms or extension 46 and 48.

A second elongated guard member 50 having a first end 52, a second end 54, and an elongated forward edge 56 disposed generally parallel to the brush receiving opening or front side of the mower head. The second guard member second end 54 is pivotally mounted by a second pivot means 58 the first guard member forward extension 48. The second guard member first end 54 is slidably received in a second channel portion 60 of the first guard member such that the second guard member is adapted to pivot about the second pivot means. A stop means such as a raised rearward edge 62 of the first guard member limits the pivotal movement of the second guard member to about 7° to 10°.

In this manner, when the forward motion of the mower head urges the first end 52 of the second guard member 50 against a sapling, the second guard member pivots about pivot 58 until it impacts the stop means 62 to expose the deck and first guard member cutter exposing openings 24 and 44. When the forward motion of the cutter head causes the second end 54 of the second guard member to impact a sapling, the force is transmitted from the second guard member through the pivot 58 to the second end 36 of the first guard member. The force urges the first guard member to pivot about pivot 38 until the first guard member impacts the stop means 42 exposing the deck cutter exposing opening 24. When the forward motion of the mower head causes the second guard member to impact a sapling between its first and second ends, the force urges the second guard member to pivot about pivot 58 until it impacts the stop means 62 partially exposing the deck and first guard member cutter exposing openings and the force is transmitted through pivot 58 causing the first guard member to pivot about pivot 38 until it impacts the stop means 52 further opening the deck cutter exposing opening 24. By a combination of the pivotal motion of the first and second guard members, the cutter exposing opening is opened sufficiently that small trees and the like can pass into the path of the cutter to be severed.

A biasing means 70 biases the guard assembly toward a first or cutter guarding position in which the guard assembly extends over the cutter path. In the preferred embodiment, the biasing means includes a first spring means 72 which biases the second end of the first guard member forward away from the stop means and a second spring means 74 which biases the first end of the second guard member forward away from the stop means. If the boom assembly is designed with a breakaway feature in which it pivots toward the rear under a preselected pressure, the biasing force of the biasing means is selected such that the guard members yield under a lesser force than the breakaway force.

Figure 6:
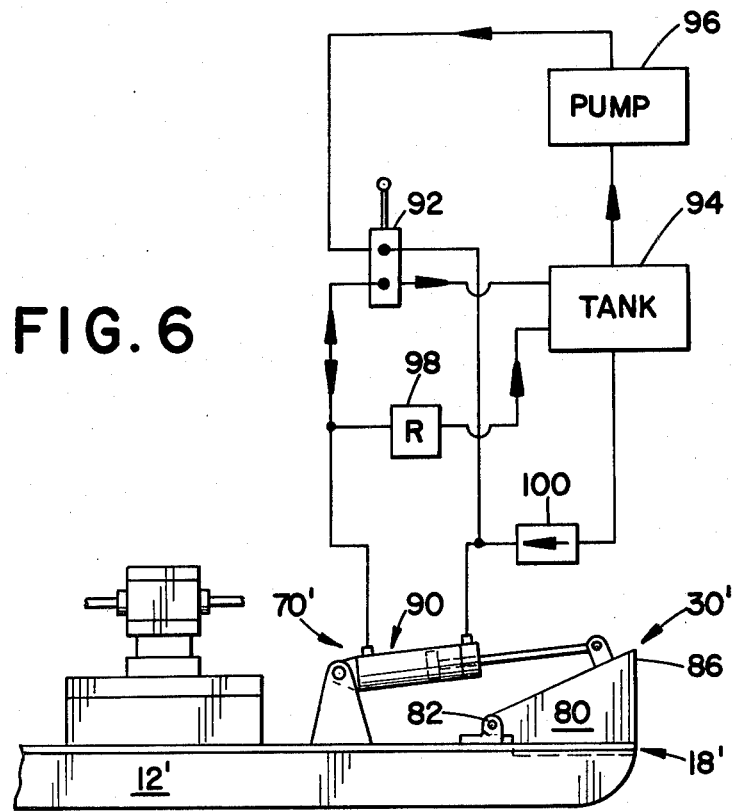
FIG. 6 is a side elevational view of the mower head of FIG. 5.

With reference to FIGS. 5 and 6, an alternate embodiment of a mower in accordance with the present invention is illustrated. In the embodiment of FIGS. 5 and 6, like elements with the embodiment of FIG. 1 are denoted by the same reference numeral but followed by a prime ('). The arm assembly B which connects the mower head C with the prime mover A is illustrated as being a side arm assembly. The side arm assembly includes hydraulic cylinders for selectively raising or lowering the mower head and for selectively adjusting its orientation to accommodate sloping surfaces and the like. The mower head C includes a guard assembly 30' positioned adjacent a forward side 18' of a shield assembly 12'. The guard assembly includes a guard member 80 which is pivotally connected with the shield by pivots 82 and 84 along its rearward edge. In this manner, when a forward edge 86 strikes an object, the guard member pivots upward and rearward exposing the cutter. A biasing means 70' biases the guard assembly forward. The biasing means includes a hydraulic cylinder 90 having a forward chamber and a rearward chamber on opposite sides of a piston. A four way hydraulic control valve 92 with system relief receives hydraulic fluid under pressure from a reservoir 94 and a pump 96. The control valve 92 maintains a selected biasing force across the cylinder to bias the guard forward. When the guard impacts an object urging the piston rearward, a relief valve 98 allows fluid to flow from the rear chamber of the cylinder to the reservoir 94 and a check valve 100 allows fluid to be drawn from the reservoir into the forward chamber of the cylinder. In this manner, the hydraulic system allows the guard to yield under a preselected force and when the force is removed, such as by the obstacle being cut by the cutter, the cylinder again returns the guard to its forward position.

With reference to FIG. 7, another alternate embodiment of a mower head in accordance with the present invention is illustrated. In the embodiment of FIG. 7, like elements with the embodiment of FIG. 1 are denoted with the same reference numeral but followed by a double prime ("). A deck 20" of the mower head C has a cutter exposing opening at its forward end 18". A guard assembly 30" is biased by a biasing means 70" toward a first or forward position across the cutter exposing opening. The guard assembly includes a guard member 110 which is slidably connected with the deck by a guide means 112 along its side edges. In this manner, when a forward edge 114 strikes an object, the guard member slides rearward exposing the cutter. The biasing means 70" includes a through-rod type hydraulic cylinder 120 connected between the guard member and the deck. A four way hydraulic control valve 122 with system relief receives hydraulic fluid under pressure from a hydraulic reservoir 124 and a pump 126. The control valve 122 in conjunction with a relief valve 128 maintains a selected pressure across a piston in the hydraulic cylinder. In this manner, the guard assembly is biased forward with a selected force. When the guard impacts an object, the piston tends to be urged rearward decreasing the pressure in a forward chamber of the cylinder and increasing the pressure in a rearward chamber. This causes the control and relief valves to channel fluid from the rearward chamber into the forward chamber until the selected pressure differential between the forward and rearward chambers is again reached. In this manner, the hydraulic system allows the guard to move rearward under a selected force and moves the guard forward when the rearward force is removed.

The mower head has been illustrated in conjunction with boom and side arm assemblies for controlling its position. Although these types of arm assemblies have been found to be particularly advantageous, it is to be appreciated that other mounting or positioning means may be used. Further, any of the above described mower head embodiments and other mower heads in accordance with the present invention are usable in conjunction with a boom arm assembly, side arm assembly, or other mounting means. Further yet, the various above described mechanical spring and hydraulic cylinder guard biasing means embodiments as well as other biasing means in accordance with the present invention, may be utilized in conjunction with others of the above described mower heads or mounting means in accordance with the present invention.

The invention has been described with reference to the preferred and alternate embodiments. Obviously, alterations and modifications will occur to others upon reading and understanding the preceding detailed description. It is intended that the invention be construed as including all such alterations and modifications insofar as they come within the scope of the appended claims or the equivalents thereof.

Having described preferred and alternate embodiments of the invention, the invention is now claimed to be:

1. A mower head comprising:
   a deck disposed above and generally parallel to a path of a rotary cutter, the deck defining a cutter exposing area along a first side such that the cutter path extends beyond the deck and is exposed;
   a guard assembly with plural pivoting guard members is disposed for movement within a plane parallel to the deck toward and away from the first side such that the guard assembly is moveable between a first position covering the cutter exposing area and a second position at least partially exposing the cutter exposing area; and,
   biasing means for biasing the guard assembly toward the first position, whereby the guard assembly is moveable against the biasing means for selectively exposing the rotary cutter.

2. A mower head comprising:
   a deck disposed above a path of a rotary cutter, the deck defining a cutter exposing area along a first side that the cutter path extends beyond the deck and is exposed;
   a first guard member disposed substantially parallel to the first side and pivotally mounted to the upper deck at a first end thereof, the first guard member defining a cutter exposing opening therein;
   a second guard member extending substantially parallel to the first side and pivotally mounted to the first guard member for movement between a first guard member cutter exposing opening covering position and a first guard member cutter exposing opening uncovering position;
   whereby the first and second guard members are adapted to pivot together partially exposing the cutter path and the second guard member is adapted to pivot relative to the first guard member at least partially exposing the cutter path; and,
   guard biasing means for biasing the first and second guard members toward a position parallel to the first side, whereby the first and second guard members are pivotable against the biasing means for selectively exposing the rotary cutter.

3. The mower head as set forth in claim 2 wherein the guard biasing means includes a first resilient spring means operatively connected between the second guard member and the deck for biasing the first guard member substantially parallel to the first side and a second spring means operatively connected between the second guard member and the first guard member for biasing the second guard member substantially parallel with the first side.

4. The mower head as set forth in claim 3 further including a first track defining means for slidably receiving a second end of the first guard member, the track being mounted on the deck, for constraining the first guard member to move in a plane generally parallel to the deck.

5. The mower head as set forth in claim 4 further including a second track defining means mounted adjacent a first end of the first guard member for slidably receiving a first end of the second guard member for constraining the second guard member to pivot generally in the plane of the deck.

6. A mower comprising:
   a prime mover which is self-propelled in at least a forward and rearward direction;
   an arm assembly operatively connected at a first end with the prime mover; and,
   a mower head operatively connected with a second end of the arm assembly, the mower head including:
   a cutter which is positionable by the arm assembly to rotate in a circular cutting path;
   a shield including: a deck extending above and substantially parallel to the cutting path, the deck defining a cutter exposing area along a forward side thereof between forward extending first and second deck extensions; a downward extending skirt which extends downward from the deck forward extensions, from a deck rear side, and from the deck between the forward and rear side; track means extending generally rearward along the first deck forward extensions;
   a guard assembly which is disposed along the forward side of the shield and which is slidable parallel to the cutting path in the track means, along a generally forward to rearward path for selectively exposing and covering the cutter exposition area and,
   a biasing means for biasing the guard assembly forward with a selected force such that upon encountering an object with greater than the selected force, the guard is rearwardly moveable to expose the cutter.

7. The mower as set forth in claim 6 wherein the arm assembly includes a plurality of pivotally interconnected arms and a boom hydraulic control assembly for controlling the position of each of the plurality of arms.

8. The mower as set forth in claim 7 further including a hydraulically operated motor mounted on the shield for rotating the cutter.

9. The mower as set forth in claim 6 wherein the guard assembly includes a first guard member defining a cutter exposing opening therein and pivotally mounted to the second deck extension at a first end thereof and slidably received in the first track means at a second end thereof, and a second guard member pivotally mounted to the first guard member for movement between first guard member cutter exposing opening covering and uncovering positions, whereby the first and second guard members are adapted to pivot together at least partially exposing the cutter path and the second guard member is adapted to pivot relative to the first pivot member at least partially exposing the cutter path.

10. The mower as set forth in claim 9 wherein the biasing means includes a first resilient spring means operatively connected between a first end of the second guard member and the deck for biasing the first guard member substantially parallel to the deck forward side and a second spring means operatively connected between a second end of the second guard member and the first guard member first end for biasing the second guard member substantially parallel with the deck forward side.

11. The mower as set forth in claim 10 further including a second track defining means mounted adjacent the first end of the first guard member for slidably receiving the second end of the second guard member for constraining the second guard member to pivot generally in the plane of the deck.

12. The mower as set forth in claim 6 wherein the biasing means includes a hydraulic cylinder operatively connected between the guard assembly and the deck and a hydraulic control circuit for causing the hydraulic cylinder to urge the guard assembly forward with the selected biasing force.

13. The mower as set forth in claim 12 wherein the hydraulic circuit includes a hydraulic control valve for selectively controlling the biasing force.

14. The mower as set forth in claim 12 wherein the hydraulic circuit includes means for causing the hydraulic cylinder to allow the guard assembly to move rearward in response to the guard assembly impacting an obstacle.

* * * * *